3,219,531
FLAVONE DERIVATIVES
Rolland Blaise, Paris, France, assignor of one-half to Societe Anonyme pour l'Industrie Chimique, Mulhouse-Dornach, France
No Drawing. Filed July 27, 1961, Ser. No. 127,137
Claims priority, application France, Aug. 4, 1960, 834,965, Patent 1,271,673; Belgium, Aug. 29, 1960, 472,488, Patent 594,499; France, Feb. 13, 1961, 852,523
4 Claims. (Cl. 167—81)

The present invention relates to novel flavone derivatives consisting of acids having the general formula $$HOOC-CH-OC_{15}H_{(9-n)}O_2(OH)_n \quad \text{(I)}$$
$$\phantom{HOOC-CH-}R$$

wherein R=H or $CH_3$, $n=0$ or 1, the $$HOOC-CH-O-$$
$$\phantom{HOOC-}R$$

group being in position 7 on the flavone nucleus having the formula:

and the $(OH)_{n=1}$ group being in position 5 or 4'. This invention is also concerned with the alkaline salts of these acids which are soluble in water and yield a neutral solution, and the alkaline-earth salts of these acids.

These products constitute useful reduction and hydrogenation catalysts for many industrial applications.

Acids according to Formula I hereinabove are prepared by condensing the hydroxylated flavone derivative having the formula $HO-C_{15}H_{9-n}O_2(OH)_n$ wherein $n=0$ or 1, one OH is in position 7 and the other OH if any is in position 5 or 4', on the acid of formula $$HOOC-CH-Hal$$
$$\phantom{HOOC-}R$$

wherein R=H or $CH_3$, and Hal is a halogen, for example chlorine or bromine, in the presence of a condensation agent such as soda or potash, and by isolating the acid by acidifying the diluted hydrochloric acid.

As the Hal radical is bromine, the acid yield obtained is better when this radical is chlorine.

The alkaline or alkaline-earth salts of the acids are easily obtained by adding a base.

It is another object of this invention to prepare 5,7-di-(oxyacetic) flavone acid which is obtained as a by-product of 5-hydroxy 7-flavonoxyacetic acid in relatively low proportions when the quantity of bromoacetic acid utilized is equal or greater than 2 moles per 1 mole of 5–7 dihydroxyflavone. The di(oxyacetic) derivative is separated from the mono(oxyacetic) derivative in the form of ammonium salt, the ammonium di-acetate being considerably more soluble in water than the monoacetate.

A further object of this invention is 5,7 di-(oxyacetic) flavone acid as well as its alkaline salts, which are very soluble in water, and its alkaline-earth salts.

The following examples illustrate the invention.

EXAMPLE 1.—PREPARATION OF 7-FLAVON-OXYACETIC ACID

7-flavonoxy-acetic acid has been obtained by condensing 7-hydroxyflavone on the chloroacetic or bromoacetic acid, in the presence of a condensation agent such as soda:

$$HO-\text{[flavone]} + ClCH_2 + COOH + 2NaOH \longrightarrow$$

$$NaOOCCH_2O-\text{[flavone]} + NaCl$$

The following conditions provide the most satisfactory results:

1.0 gram of 7-hydroxyflavone (4.2 mmole) is dissolved in 3.4 cc. of an alkaline solution containing 0.34 gram of soda (8.4 mmole). The mix is stirred and 0.4 gram of chloroacetic acid (4.2 mmole) is added. The solution is heated in a water-bath under reflux conditions during two hours, then cooled and diluted with water. The precipitate is dissolved again with a small quantity of diluted soda. The phenol derivatives are precipitated by causing carbon dioxide gas to flow through the solution. After filtration, the solution is acidified with diluted hydrochloric acid and the flavonoxyacetic acid is filtered, washed and dried. The yield is from 0.61 to 0.64 gram of white product, M.P.=267° C.-9° C.

This product can be recrystallized in nitrobenzene, acetic acid, dimethylformamide either pure or in admixture with water, alcohol diacetone, etc. The M.P. remains unchanged.

The carbon-hydrogen assay showed 68.5% C and 3.84% H; the theoretical percentages being 68.9% C and 4.08% H for $C_{17}H_{12}O_5$.

If bromoacetic acid is substituted for chloroacetic acid, the yields of flavonoxyacetic acid are increased considerably (0.7–0.8 g.).

The alkaline salts of this acid are soluble in water and give a neutral solution.

Various tests carried out in the laboratory made it possible to analyse all the factors of this reaction. The following data were obtained:

(1) *Proportions of reagents*

(a) CHLOROACETIC (OR BROMOACETIC) ACID

The best method consists in using stoichiometric quantities of chloroacetic acid and hydroxyflavone. In fact, a 100% chloroacetic excess will definitely not increase the yields of flavonoxyacetic acid.

(b) ALKALIS (SODA OR POTASH)

To maintain the hydroxyflavone in aqueous solution the quantity of soda must be sufficient to neutralize the chloroacetic acid on the one hand and build up the sodium salt of the hydroxyflavone on the other hand; in other words, at least 1 mole of soda per mole of chloroacetic acid and at least one mole of soda per mole of hydroxyflavone are necessary, as proved by the reaction equality given hereinabove. It is the use of this minimum quantity of soda that yields the best results.

Nota bene: Actually a side reaction takes place which requires very little soda and is defined by the following formula:

$$ClCH_2-COONa + NaOH \rightarrow HOCH_2-COONa + NaCl$$

This reaction may also take place at the expense of the hydroxyflavone sodium salt; this accounts for the precipitation of hydroxyflavone at the end of the reaction, when no more soda is present. This precipitation is considerably lower in a concentrated medium than in a diluted medium. In this case a phenomenon of solubilization of the hydroxyflavone in the concentrated reaction medium is observed. This solubilization disappears if the dilution is increased by using greater quantities of water.

If more than one mole of excess soda is used, no more flavonoxyacetic acid is obtained.

On the other hand, with a want of soda the hydroxyflavone will not dissolve completely and the insoluble portion remains unreacted.

(2) Reaction time

After half an hour heating at 90° C.–100° C., the quantities of flavonoxyacetic acid built up are approximately equal to half those obtained after a two-hour heating period. Beyond this time the yield remains unchanged.

(3) Method of mixing the reagents

As the reaction is rather slow at 90° C.–100° C., it is inasmuch slower at room temperature. Therefore, the reagents may be mixed in the cold state in the desired order, without appreciably modifying the results, but the most convenient method is the one described in the above example.

If it were contemplated to add the reagents in the heated state, the foregoing would probably not hold true.

(4) Condensation agents

It has been attempted to substitute other products capable of fixing the hydrochloric acid for the soda (or potash); thus, the following substances have been tried:

(a) Sodium carbonate:

In this case only traces of flavonoxyacetic acid are obtained.

Nota bene: The pH of the reaction medium may probably not be strong enough to permit a condensation. On the other hand, it is observed that hydroxyflavone is insoluble in the cold state in sodium carbonate solutions and that it is necessary to heat considerably before it dissolves therein. When cooling, the hydroxyflavone precipitates again and therefore the following reaction of equilibrium may be written.

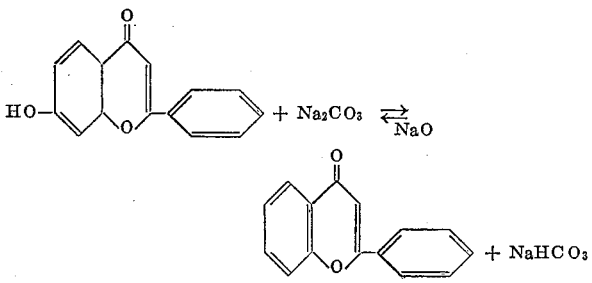

(b) An organic base such as pyridine:

The hydroxyflavone and chloroacetic acid, heated together in pyridine, do not yield flavonoxyacetic acid.

(c) In the absence of any condensation agent, it has not been possible to prepare flavonoxyacetic acid.

For example, hydroxyflavone can be dissolved in bromoacetic acid at 90° C.–100° C., but no reaction takes place, even after several hours.

(5) The concentration of the reaction medium

The minimum quantity of water necessary for dissolving the whole in the cold state is used, for any excess water will reduce the yields of flavonoxyacetic acid. The solubilization of the hydroxyflavone in the concentrated reaction medium (see 1–(B)) explains the detrimental influence of an excess of water.

(6) Purity of reagents

Raw hydroxyflavone and hydroxyflavone having been recrystallized several times in pyridine or alcohol give the same results.

(7) After the reaction, the flavonoxyacetic acid is separated from the unreacted hydroxyflavone by precipitating the latter by means of carbon dioxide gas. The filtration of this recovered hydroxyflavone is slow at first, but becomes nearly impossible when the product is washed with water. It appears that this is a matter of pH, and that it is well to wash the precipitate with a bicarbonate solution, for example, rather than utilizing water. In the pH zone from 7 to 5 the hydroxyflavone tends to develop a gel. Only a definitely acid pH permits an easy filtration, but in this case the phenol derivative is not separated from the acid derivative.

The precipitation of the hydroxyflavone may also be carried out by adding hydrochloric acid very diluted up to a pH of about 8.

EXAMPLE 2.—PREPARATION OF α (7-FLAVONOXY)-PROPIONIC ACID

It is obtained in the same manner as 7-flavonoxyacetic acid. For example, a 1.0-gram solution of 7-hydroxyflavone (4.2 mmoles) in 1.7 cc. of a solution containing 0.17 gram of soda is mixed with a solution of 0.45 gram of α-chloropropionic acid (4.2 mmoles) in 1.7 cc. of a solution containing 0.17 gram of soda. The solution is heated during one hour in a water-bath and then cooled and diluted with water, the precipitate being re-dissolved by adding 3 cc. of ordinary soda. The phenol derivatives are precipitated by bubbling carbon dioxide gas through the solution, and then separated by filtration. The flavonoxypropionic acid is precipitated by acidifying the filtrate with diluted hydrochloric acid.

Thus, 0.125 g. of raw product is obtained, M.P.=215° C.–250 C. After recrystallization in 1 cc. of acetic acid, beige crystals of α (7-flavonoxy)-propionic acid are obtained.

M.P.=227° C.–30° C.

Its sodium salt is soluble in water and yields a neutral solution.

Nota bene—this preparation is not applicable with β-chloropropionic acid, for the latter reacts on the soda according to the following process:

$$ClCH_2-CH_2-COOH + 2NaOH \rightarrow CH_2=CH-COONa + 2H_2O + NaCl$$

EXAMPLE 3.—4'-HYDROXY 7-FLAVONOXY-ACETIC ACID 1.0 gram of 7.4' dihydroxyflavone (3.94 mmole) is dissolved in 6.3 cc. of an aqueous solution of 0.63 gram of soda. The solution is stirred while adding thereto by fractions 1.1 grams of bromoacetic acid (7.88 mmole), and heated during 2 hours in a water-bath. After cooling the mix is diluted with water and the precipitate if any is re-dissolved by using a small amount of soda. If necessary, a stream of carbon dioxide gas is passed through the solution which is subsequently filtrated. The filtrate is acidified with diluted hydrochloride acid and the precipitated acid is filtered, washed with water and dried at 120° C.

Thus, 1.25 to 1.23 grams of a yellow to clear brown powder softening at about 230° C. and melting at about 260° C. are obtained. After recrystallization in a mixture of dimethylformamide and water (1/1) there remains 0.96 to 0.81 gram melting above 275° C.

The sodium salt of this product is soluble in water and gives a neutral solution.

It may be noted that in the case of dihydroxyflavones the halogenated acid does not react completely on the hydroxyl in position 7 unless the quantity of halogenated acid utilized is about twice the necessary theoretical quantity.

EXAMPLE 4.—5-HYDROXY 7-FLAVONOXY-ACETIC ACID

The description of the reaction is exactly the same as in the preceding cases.

After separating the phenolic derivatives precipitated by the carbon dioxide gas the filtrate is acidified and a brown gummy product representing 0.61 to 0.65 gram is obtained. It can be recrystallized in in acetic acid or dimethylformamide and water. Under these conditions there remains from 0.21 to 0.26 grams of a beige product, M.P.=266° C.–8° C.

This product forms a neutral, water-soluble sodium salt.

EXAMPLE 5.—FLAVONE 5.7 DI(OXYACETIC) ACID

This acid is obtained from 5.7 dihydroxyflavone and bromoacetic acid in the presence of soda, theoretically according to the reaction:

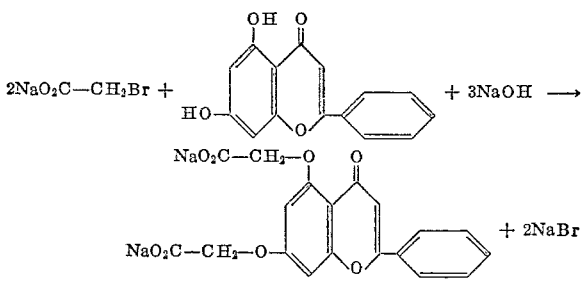

The flavone 5,7 di(oxyacetic) acid actually builds up only in small amounts beside the 5-hydroxy 7-flavonoxy-acetic acid.

A method of preparation involving the separation of the two acids formed simultaneously is as follows: 40.4 grams of 5,7 dihydroxyflavone are suspended in water and heated in a water-bath. During about one hour a mixture of 44.4 grams of bromacetic acid previously alkalinized with an aqueous solution of 25.6 grams of soda are added. After a few hours' heating the mix is diluted with a large quantity of water and then neutralized. The precipitate is separated by filtration. The filtrate is acidified and the acid precipitate is filtered and finally washed with water.

The raw product thus obtained is dissolved in an excess of ammonia in the hot state. By cooling, the 5-hydroxy 7-flavonoxyammonium acetate crystallizes. After filtration, the product is dissolved again in warm water and acidified, to yield practically pure 5-hydroxy 7-flavonoxy acetic acid. It can be recrystallized in a mixture of dimethyl-formamide and water. The product thus purified is colourless and melts at 274° C.

The diacetic derivative is recovered in the form of precipitate by acidifying the ammonia-containing mother liquors. Its purity is considerably lower than that of the monoacid, and it is more difficult to purify. It is recrystalized one or several times, if necessary, in a mixture of dimethylformamide and water. The pure 5,7 di(oxyacetic) flavone acid consists of small beige crystals melting at about 280° C. The ammonium and sodium salts of this acid, for example, are very soluble in water.

The quantities of monoacetic acid and diacetic acid thus recovered are in the ratio of about 80 to 20.

The works of Szent-Gyorgyi have made specialists familiar with the existence of a vitamin called according to different authors P or $C_2$, which appears to be the complementary and necessary vitaminic factor of vitamin C (ascorbic acid).

The chemical nature of this vitamin P or $C_2$ has never been ascertained but it has been possible to establish that different compounds behave like pro-vitaminic factors. Among these compounds, a number of iso-flavones, chalcones, catechols, etc., are known.

It is another object of this invention to provide, by way of provitaminic factors P, a number of flavonic derivatives. These are more particularly the 7-oxy-acetic and 7-oxy-propionic acid derivatives of 7-hydroxy-flavone, 5,7-dihydroxy-flavone and 7,4'-dihydroxy-flavone, 5,7 di(oxyacetic) flavone acid as well as the alkaline and alkaline earth salts of these acids and the mixtures of these various compounds.

The acid derivatives and their salts are the novel products defined hereinabove and prepared in the manner set forth hereinabove.

The essential therapeutic property of these flavonic derivatives is their beneficial action on the vascular tissue resistance.

It has been observed that the effect of flavone 5,7-di-(oxyacetic) acid is faster than that of the other flavonic acids considered herein.

Typical examples of therapeutic applications of flavonic derivatives according to this invention are given hereinafter:

(1) *Administration through the oral route.*—This administration is intended for maintenance treatments.

Compound utilized for adults: 5,7-di-oxyacetic acid flavone. Daily doses: (a) 100 milligrams twice per day during one week. This represents the typical treatment by strong doses during a short time. (b) 10 milligrams twice per day during three months. This is a typical extended treatment utilizing moderate doses.

(2) *Administration through the parenteral route.*—

Injections:
  Subcutaneous
  Intramuscular
  Intravenous

Intravenous injections are preferred.

Compounds utilized: 7-flavonoxy-soda acetate or 5-hydroxy-7-flavonoxy-sodium acetate or flavone 5,7 di(oxysodium acetate), either separately or in admixture.

The solvent consists of a sodic isotonic phosphated solution blocked at pH 7.

Doses utilized: 100 milligrams.
One injection morning and evening.

Treatments:
  Rupture or incipient rupture of vascular tissues.
  Purpurae of various origins.
  Intra-ocular haemorrhages.

What I claim is:

1. A provitaminic P factor in dosage units consisting of a pharmaceutically acceptable carrier and about 100 milligrams of at least one member selected from the group consisting of 5,7-di-oxyacetic acid flavone, the sodium, potassium and ammonium salts of said acid.

2. A method of treating a patient for deficiencies in provitaminic P-factors in order to increase the resistance against ruptures of vascular tissues, which consists in administering to a patient having decreased capillary resistance, by intra-muscular injection, at least one member selected from the group consisting of 5,7-di-oxyacetic acid flavone, the sodium, potassium and ammonium salts of said acid.

3. A method as set forth in claim 2, which consists in administering twice per day 100 milligrams of said flavonic compound.

4. A method of treating a patient for deficiencies in pro-vitaminic P-factors in order to increase the resistance against ruptures of vascular tissues, which consists in administering to a patient having decreased capillary resistance, by oral administration, at least one member selected from the group consisting of 5,7-di-oxyacetic acid flavone, the sodium, potassium and ammonium salts of said acid.

References Cited by the Examiner

UNITED STATES PATENTS

| | | | |
|---|---|---|---|
| 2,543,674 | 2/1951 | Swayne | 167—81 |
| 2,700,047 | 1/1955 | Wilson | 260—345.2 |
| 2,789,930 | 4/1957 | Wilcox et al. | 167—55 |
| 2,841,526 | 7/1958 | Gustus | 167—55 |
| 2,890,225 | 6/1959 | Gregory | 260—345.2 |
| 2,892,845 | 6/1959 | Jurd | 260—345.2 |
| 2,892,846 | 6/1959 | Jurd | 260—345.2 |
| 2,897,211 | 7/1959 | Da Re | 167—81 |
| 2,912,358 | 11/1959 | Staib | 167—55 |

FOREIGN PATENTS

| | | |
|---|---|---|
| 988,832 | 8/1951 | France. |
| 988,833 | 8/1951 | France. |

OTHER REFERENCES

Eddy: Vitaminology, 1949, p. 328.

Scarborough: Vitamins and Hormones, vol. VII, 1949, pp. 7–10, 16–17.

LEWIS GOTTS, *Primary Examiner.*

IRVING MARCUS, MORRIS O. WOLK, FRANK CACCIAPAGLIA, JR., JULIAN S. LEVITT, *Examiners.*